United States Patent [19]

Rabinkin

[11] Patent Number: 4,802,933

[45] Date of Patent: Feb. 7, 1989

[54] NICKEL-PALLADIUM BASED BRAZING ALLOYS

[75] Inventor: Anatol Rabinkin, Morris Plains, N.J.

[73] Assignee: Allied-Signal Inc., Morris Township, Morris County, N.J.

[21] Appl. No.: 184,324

[22] Filed: Apr. 21, 1988

[51] Int. Cl.$^4$ .............................................. C22C 5/04
[52] U.S. Cl. ................................ 148/403; 228/263.15; 228/263.18; 420/463; 428/606
[58] Field of Search ........................ 148/403; 428/606; 420/463; 228/263.15, 263.18

[56] References Cited

U.S. PATENT DOCUMENTS

| | | | | |
|---|---|---|---|---|
| 4,149,881 | 4/1979 | D'Silva | .................... | 420/588 |
| 4,405,391 | 9/1983 | DeCristofaro | .................... | 148/403 |
| 4,508,257 | 4/1985 | Bose et al. | .................... | 228/263.15 |
| 4,746,379 | 5/1988 | Rabinkin | .................... | 148/403 |

FOREIGN PATENT DOCUMENTS

| | | | |
|---|---|---|---|
| 666093 | 7/1963 | Canada ........................ | 420/463 |
| 145138 | 11/1980 | Japan ........................... | 420/463 |
| 151454 | 9/1983 | Japan . | |
| 205434 | 11/1984 | Japan . | |
| 59-032 | 4/1985 | Japan ........................... | 420/463 |
| 1207751 | 10/1970 | United Kingdom ............ | 420/463 |

*Primary Examiner*—L. Dewayne Rutledge
*Assistant Examiner*—Robert L. McDowell
*Attorney, Agent, or Firm*—Gus T. Hampilos

[57] ABSTRACT

A nickel-palladium-based brazing alloy is disclosed having a composition consisting essentially of about 38 to about 55 atom percent palladium, about 19 to about 34.5 atom percent iron, about 11 to about 20 atom percent silicon, the balance being essentially nickel and incidential impurities. These alloys are especially suited for use as brazing filler metals in joining stainless steels and/or superalloys at temperatures above about 1000° C. A process for brazing honeycomb structures formed at least in part from stainless steels and/or superalloys is also disclosed.

9 Claims, No Drawings

NICKEL-PALLADIUM BASED BRAZING ALLOYS

BACKGROUND OF THE INVENTION

This invention is directed to brazing filler metals of nickel-palladium-based alloys which contain the transition metal iron to produce an alloy which is particularly useful for brazing a wide variety of materials at high temperatures, and results in the production of high strength brazements. More particularly, the invention is directed to quaternary alloys of nickel-palladium-iron-silicon having liquidus temperatures of at least about 980° C.

Brazing is a process of joining metal parts, often of dissimilar composition, to each other. Typically, a brazing filler metal that has a melting point lower than that of the parts to be joined is interposed between the parts to form an assembly. The assembly is then heated to a temperature sufficient to melt the brazing filler metal. Upon cooling, a strong, preferably corrosion resistant, joint is formed.

Brazing filler metals consisting of nickel-palladium-based alloys have been developed which exhibit high temperature strength, good corrosion resistance and good erosion resistance. Such alloys have been disclosed, for example, in U.S. Pat. Nos. 4,508,257, 4,405,391 and 4,448,618. The alloys disclosed in these patents, however, each exhibit drawbacks which make them unsuitable for brazing products which require prolonged service life at high temperatures. The alloys disclosed in U.S. Pat. Nos. 4,405,391 and 4,448,618 contain boron in substantial amounts. It is well known that boron diffuses extensively out of the joint area into to stainless steel and superalloy base metals when subjected to brazing at very high temperatures and, also, during prolonged service of the brazed joint at elevated temperatures. Specifically, boron, with its small atomic radius, diffuses along grain boundaries forming therein intermetallic borides and resulting in brittle fracture under loading at elevated temperatures. Therefore, alloys containing boron, in spite of having rather high melting characteristics, are not suitable for brazing products designed to withstand high temperature environments, for example, stainless steel and/or superalloy honeycomb structures employed in aircraft wings. Regarding the ternary nickel-palladium-silicon alloys disclosed in U.S. Pat. No. 4,508,257, these alloys have large concentrations of nickel and silicon but contain essentially no boron. Although the problem associated with boron is avoided, the high nickel and silicon content results in a rather low melting temperature product. Specifically, these alloys have liquidus temperatures in the range of about 877–948° C. Therefore, these alloys are not effective for use in brazing products to be employed in high temperature applications.

Most recently, a new class of nickel-palladium-based alloys were developed (see U.S. ser. No. 89,276, filed Aug. 25, 1987 and commonly assigned now U.S. Pat. No. 4,746,375), which are substantially free of boron. However, these alloys were developed to overcome problems associated with brazing cemented carbide parts and, unfortunately, are unsuitable for high temperature brazing and for use in structures employed in high temperature environments due to their low melting point (less than about 950° C.).

Accordingly, there remains a need in the art for brazing filler materials suitable for brazing stainless steels and superalloys at high temperatures and which will result in brazements which retain high strength at elevated temperatures over prolonged periods of time.

SUMMARY OF THE INVENTION

The present invention is directed to improved brazing filler metal which possess high temperature melting characteristics, low erosion and a high strength at elevated temperatures. These brazing alloys consist essentially of quaternary nickel-palladium-iron-silicon alloys having composition defined by the following formula:

$$Pd_aFe_bSi_cNi_{balance},$$

where the subscripts "a", "b" and "c" are all in atomic percent and wherein "a" is between about 38 and about 55, "b" between about 19 and about 34.5, and "c" is between about 11 and about 20.

In addition, the invention provides brazing filler metals in the form of homogeneous ductile brazing foils which are composed of metastable materials preferably having at least 50% glassy structure.

Further, in accordance with the present invention, an improved process is disclosed for joining stainless steels and/or superalloys honeycomb structures, which process comprising the steps of:

(a) interposing a filler metal of the above described composition between base metal parts to form an assembly.

(b) heating the assembly to a temperature above the liquidus temperature of the brazing filler metal; and, (c) cooling the assembly to provide a brazed honeycomb product.

DETAILED DESCRIPTION OF THE INVENTION

In any brazing process, the brazing material must have a melting point that will be sufficiently high to provide strength to meet service requirements of the metal parts to be brazed together. However, the melting point must not be so high as to make difficult the brazing operation. Further, material must be compatible, both chemically and metallurgically, with the base metal parts being brazed. Also, the brazing material must be more noble than the base metal being brazed to avoid corrosion. Ideally, the brazing material should be in foil form so that complex shapes may be stamped therefrom and so that brazing of complex joints can be readily accomplished. Finally, brazing foils should be homogeneous and ductile; that is, contain no binders or other materials that would otherwise form voids or contaminating residues during brazing, and exhibit sufficient flexibility such that the foil can be bent to a round radius as small as about 10 times the foil thickness without fracture.

In accordance with the present invention, quaternary alloys of nickel-palladium-iron-silicon are provided which exhibit a liquidus of at least about 980° C. and are particularly suitable for brazing stainless steel and superalloys. The brazing filler metals have a composition consisting essentially of about 38 to about 55 atom percent palladium, about 19 to about 34.5 atom percent iron, about 11 to about 20 atom percent silicon, the balance being nickel and incidental impurities.

The alloys of the present invention exhibit a number of advantageous properties not recognized nor disclosed heretofore. These alloys exhibit a high melting temperature as compared to prior art ternary nickel-palladium-silicon-based compositions because of the replacement of nickel with iron. These alloys exhibit none of the diffusion problems associated with boron containing alloys because they contain only silicon. Further, the elimination of boron coupled with maintaining silicon concentration at relatively low levels enables the production of a ductile product. Moreover, increasing the palladium concentration at the expense of the nickel concentration preserves the ability of the alloy to be formed in the amorphous state and to remain ductile. Finally, the alloys of the present invention exhibit excellent resistance to erosion.

The alloys of the present invention are ordinarily produced in the form of homogeneous, ductile foils or wires by casting alloys of the above described composition using rapid solidification techniques. More specifically, the homogeneous brazing filler metals of the present invention are most preferably fabricated by a rapid solidification process which comprises forming a melt of the composition in quenching the melt on a rotating quenching wheel at a rate of at least about $10^5$° C. per second. Such a process is disclosed in U.S. Pat. No. 4,142,571.

Under these quenching conditions, a metastable, homogeneous ductile product is obtained. The metastable material may be glassy, in which case there is no long range order as evidenced by X-ray defraction patterns which show a diffuse halo, similar to that observed for inorganic oxide glasses. Preferably, alloys of the present invention are at least 50% glassy to achieve superior ductility, and most preferably it is at least about 90% glassy.

Metastable products may also be a solid solution of constituent elements. In the case of the alloys of the present invention, such metastable, solid solution phases are not ordinarily produced under conventional processing techniques employed in the art of fabricating crystalline alloys. Accordingly, the above-described casting processes are employed. X-ray diffraction patterns of the solid solution alloys show sharp diffraction peaks characteristics of crystalline alloys with some broadening due to production of highly desired fine-grain products. These metastable products are also ductile.

Foils produced by the rapid solidification process described are between about 13 and about 100 micrometers thick, ordinarily between about 13 and about 76 micrometers thick. Because these products are homogeneous (i.e., of substantially uniform composition in all directions), brazements produce therefrom are quite uniform and substantially free of voids.

Within the broad range of the compositions of the present invention, a most preferred embodiment has been discovered having a composition of between about 39 and about 41 atom percent palladium, between about 27 and about 34.5 atom percent iron, between about 11 and about 16 atom percent silicon, and between about 13 and about 26 atom percent nickel. The alloys within this most preferred embodiment exhibit a very narrow melting temperature range of between about 920° C. and about 1020° C. and, most preferably, range from about 960° C. to about 1020° C. The specific advantages of these alloys include the ability to braze at reasonably low temperatures and to provide a brazement which can be employed at elevated temperatures up to about 750° C. without any significant degradation of mechanical properties. These alloys are particularly suited for the brazing of Inconel 718 honeycomb structures which are used in airplane wings for space travel.

The following examples illustrate certain embodiments of the present invention but are not intend to limit the scope of the invention as defined in the subjoined claims.

EXAMPLE 1

Ribbon of from about 2.54 to about 25.4 mm (about 0.1 to about 1 inch) wide and about 13 to about 76 micrometers (about 0.0005 to about 0.003 inch) thick were formed by continually depositing a melt of each of the compositions set forth in Table 1, below, by overpressure of argon onto a rapidly rotating copper chill wheel (surface speed about 3000 to about 6000 ft/min). Metastable homogeneous ribbons having substantially glassy structure were produced. The liquidus and solidus temperatures of the ribbons described in Table 1 were determined by the Differential Thermal Analysis (DTA) technique. The individual samples were heated side by side with an inert reference material at a uniform rate, and the temperature difference between them was measured as a function of temperature. A thermogram is produced (a plot of heat-energy change vs. temperature) from which the beginning of melting and the end of melting, known respectively as solidus and liquidus temperatures, are determined. The values are reported in the Table 1.

TABLE 1

| Sample No. | Composition (at %) | Solidus, °C. | Liquidus, °C. |
|---|---|---|---|
| 1 | $Ni_{13.5}Pd_{41}Fe_{34.5}Si_{11}$ | 960 | 1020 |
| 2 | $Ni_{12.7}Pd_{38.8}Fe_{32.7}Si_{15.8}$ | 980 | 1020 |
| 3 | $Ni_{18.3}Pd_{38.7}Fe_{27.2}Si_{15.8}$ | 955 | 1020 |
| 4 | $Ni_{25.9}Pd_{39}Fe_{19.3}Si_{15.8}$ | 920 | 980 |

I claim:
1. An alloy having a composition represented by the formula:

$$Pd_aFe_bSi_cNi_{bal}$$

plus incidental impurities, where the subscripts "a", "b" and "c" are in atomic percent and "a" is in the range of about 38 and about 55, "b" is between about 19 and about 34.5, and "c" is in the range of about 11 to about 20.

2. The alloy as recited in claim 1 wherein the alloy is at least about 50% glassy.

3. The alloy of claim 1 wherein the alloy has a solidus of at least about 920° C. and a liquidus of at least about 980° C.

4. A homogeneous, ductile brazing foil formed from the alloy of claim 1.

5. The alloy recited in claim 1 wherein "a" is between about 39 and about 41, "b" is between about 27 and about 34.5, "c" is between about 11 and about 16, and nickel is between about 13 and about 26, wherein the total of a+b+c+Ni and incidental impurities is 100.

6. A homogeneous, ductile brazing foil formed from the alloy of claim 5.

7. The homogeneous, ductile brazing foil which is at least about 50% amorphous, has a liquidus temperature of at least about 980° C., and a composition represented by the formula:

$$Pd_aFe_bSi_cNi_{bal}$$

plus incidental impurities, where the subscripts "a", "b" and "c" are in atomic percent and "a" is in the range of about 38 and about 55, "b" is between about 19 and about 34.5, and "c" is in the range of about 11 to about 16.

8. The homogeneous, ductile brazing foil of claim 7 wherein "a" is between about 39 and about 41, "b" is between about 27 and about 34.5, "c" is between about 11 and about 16, and nickel is between about 13 and about 26, wherein the total of a+b+c+Ni and incidental impurities is 100.

9. The homogeneous, ductile brazing foil of claim 7 wherein said foil is at least about 90% glassy.

* * * * *